US010972281B2

(12) United States Patent
Scott et al.

(10) Patent No.: US 10,972,281 B2
(45) Date of Patent: Apr. 6, 2021

(54) SYSTEM AND METHOD FOR DOCUMENT INFORMATION AUTHENTICITY VERIFICATION

(71) Applicants: Guy Scott, Tanah Merah (AU); Lindsay Moloney, Bellbird Park (AU)

(72) Inventors: Guy Scott, Tanah Merah (AU); Lindsay Moloney, Bellbird Park (AU)

( * ) Notice: Subject to any disclaimer, the term of this patent is extended or adjusted under 35 U.S.C. 154(b) by 326 days.

(21) Appl. No.: 16/073,914

(22) PCT Filed: Feb. 7, 2017

(86) PCT No.: PCT/AU2017/050096
§ 371 (c)(1),
(2) Date: Jul. 30, 2018

(87) PCT Pub. No.: WO2017/136879
PCT Pub. Date: Aug. 17, 2017

(65) Prior Publication Data
US 2019/0044727 A1 Feb. 7, 2019

(30) Foreign Application Priority Data

Feb. 8, 2016 (AU) .................. 2016900405

(51) Int. Cl.
*H04L 9/32* (2006.01)
*H04L 9/08* (2006.01)
*G06F 21/64* (2013.01)

(52) U.S. Cl.
CPC .......... *H04L 9/3239* (2013.01); *G06F 21/645* (2013.01); *H04L 9/0891* (2013.01);
(Continued)

(58) Field of Classification Search
None
See application file for complete search history.

(56) References Cited

U.S. PATENT DOCUMENTS 9,166,986 B1 * 10/2015 Saylor .................. H04L 63/123
2004/0103023 A1    5/2004 Irwin et al.
(Continued)

FOREIGN PATENT DOCUMENTS

CO    7240114 A1    4/2015

OTHER PUBLICATIONS

"What is proof of existence?" [retrieved from Internet on Apr. 20, 2016] published on Dec. 22, 2015 as per Wayback Machine.
(Continued)

*Primary Examiner* — Eleni A Shiferaw
*Assistant Examiner* — Bassam A Noaman
(74) *Attorney, Agent, or Firm* — Innovation Capital Law Group, LLP; Vic Lin

(57) ABSTRACT

A system and a method for document information authenticity verification for applications including verifying the authenticity of information of statements of attainment of course documentation issued by registered training organisations, verification of travel documents and other sensitive documents requiring authenticity verification of documents issued by law firms, accountancy firms, governmental institutions and the like, the method comprises a verification record creation stage comprising: receiving document content metadata from a document; generating a metadata hash using the document content metadata; creating a blockchain transaction comprising the metadata hash; and generating computer readable data encoding the metadata hash; updating the document with the computer readable data and a document verification stage comprising: receiving the document; extracting the metadata hash from the computer readable data; and identifying the metadata hash within blockchain transactions of the blockchain to verify the authenticity of the document metadata.

14 Claims, 7 Drawing Sheets

(52) U.S. Cl.
CPC ........ *H04L 9/3247* (2013.01); *H04L 2209/38* (2013.01); *H04L 2209/60* (2013.01)

(56) References Cited

U.S. PATENT DOCUMENTS

| | | |
|---|---|---|
| 2006/0271787 A1 | 11/2006 | DeYoung et al. |
| 2011/0121066 A1* | 5/2011 | Tian .................. G06K 19/14 235/375 |
| 2011/0161674 A1 | 6/2011 | Ming |
| 2012/0203670 A1* | 8/2012 | Piersol ................ G06Q 10/10 705/27.1 |
| 2014/0254796 A1 | 9/2014 | Li et al. |
| 2015/0324789 A1 | 11/2015 | Dvorak et al. |
| 2015/0331841 A1* | 11/2015 | Antebi ............... G06F 16/1834 715/229 |
| 2015/0356555 A1 | 12/2015 | Pennanen |
| 2016/0292672 A1* | 10/2016 | Fay ....................... G06Q 20/36 |
| 2017/0075877 A1* | 3/2017 | Lepeltier ................ G06F 40/205 |
| 2017/0075938 A1* | 3/2017 | Black .................... H04L 9/3239 |
| 2017/0091467 A1* | 3/2017 | Pogorelik ............... G06F 21/57 |
| 2017/0213221 A1* | 7/2017 | Kurian ............. G06Q 20/38215 |

OTHER PUBLICATIONS

Crosby, M. et al., "BlockChain Technology Beyond Bitcoin", Pantas and Ting, Sutardja Center for Entrepreneurship & Technology Technical Report, Berkeley Engineering, Oct. 16, 2015, pp. 1-35.

International Search Report & Written Opinion dated Jun. 16, 2017 from PCT Application No. PCT/AU2017/050096.

European search report dated Jul. 29, 2019 from European Application No. 17749821.9, 4 pages.

Melanie Swan: "Blockchain: Blueprint for a New Economy" In: "Blockchain: Blueprint for a New Economy", Feb. 8, 2015 (Feb. 8, 2015), O'Reilly, XP055279098, pp. 38-40.

* cited by examiner

SYSTEM AND METHOD FOR DOCUMENT INFORMATION AUTHENTICITY VERIFICATION

FIELD OF THE INVENTION

The present invention relates to document information authenticity verification and in particular, but not necessarily entirely, to a system and method for document information authenticity verification for applications including verifying the authenticity of information of statements of attainment of course documentation issued by registered training organisations, verification of travel documents and other sensitive documents requiring authenticity verification such as documents issued by law firms, accountancy firms, governmental institutions and the like.

Also, the authenticity verification techniques described herein may be widely applied for differing document mediums including in hardcopy (i.e. paper, smart card travel document) and softcopy (i.e. electronic formats including in PDF format including being stored within document repositories) format.

BACKGROUND AND SUMMARY OF THE INVENTION

Document authenticity verification is desirous for applications including, for example, verification of the authenticity of information in legal documentation, personal identity documentation, accreditation documentation, access documentation and the like.

Problems with these documents include that information contained therein may be modified wherein, for example, accreditations are falsely claimed, documents forged and the like.

D1: US 2011/0161674 A1 (MING) 30 Jun. 2011 seeks to address this problem by disclosing a method of generating a self-authenticating document wherein authentication information for the document is encoded in a barcode which is printed on the document. A hash is calculated from the authentication information and transmitted to a server to be stored. When authenticating a scanned copy of the document, the barcode is read to extract the authentication information. A target hash is calculated from the extracted authentication information and transmitted to the server for verification. The server compares the target hash with the previously stored hash. If they are not the same, the barcode has been altered. If they are the same, the extracted authentication information is used to authenticate the scanned copy. A document ID may be generated and transmitted to the server, and used by the server to index or search for the stored hash.

However D1 suffers from the disadvantage and that the server may be compromised and the hash stored therein modified to match a tampered document.

As such, D1 is not suitable for applications requiring high security stringency such as for utilisation for boarding passes, personal identification documentation and the like.

As such, the present invention utilises, in a preferred embodiment, a distributed cryptographically based blockchain for storing document verification records in a way that cannot be altered.

Now, D2: "What is proof of existence?" [retrieved from internet on 20 Apr. 2016]<URL: https://web.archive.org/web/20151222163927/https://proofofexistence.com/about> published on 22 Dec. 2015 as per Wayback Machine D2 discloses a blockchain for storing an online distributed proof of existence of documents by means of storing individual cryptographic digests of the respective documents in the blockchain.

D2 hashes an electronic document (such as a PDF) and stores the hash as a special bitcoin transaction that encodes/contains the hash via an OP_RETURN script. This is a bitcoin scripting opcode that marks the transaction output as provably unspendable and allows a small amount of data to be inserted, which in this case is the document's hash, plus a marker to identify all of D2's transactions.

However, D2 is not directed to the problem verifying the authenticity of information in a document but rather proving that a particular document existed in a particular electronic format at a particular time.

As such, D2 cannot be used to detect whether a document has been tampered with.

Furthermore, D2 hashes the entire electronic document file and therefore cannot be used for hardcopy documents wherein slight printing, scanning, photocopying appearance aberrations would generate an entirely different hash using the system of D2 and therefore the document information contained therein would be unverifiable.

As such, in a preferred embodiment, the present invention utilises document content metadata (stored using a metadata hash, as opposed to the document hash of D1) as the basis for verification and can therefore be utilised for hardcopy documents.

Furthermore, D1 and D2 are deficient in that document information cannot be updated with the document remaining verifiable.

For example, using D2, a first bitcoin transaction would be created for an original document, and if the original document were updated, and a second bitcoin transaction would be created for the updated document.

However, using D2, both the original document and the altered document would appear to be valid, despite the original document having been superseded.

Conversely, in an embodiment, the present invention utilises blockchain update transactions for the purposes of updating document content fields in this way, during the document verification stage, the blockchain can be inspected in reverse chronological order to detect whether or not a document (or specific document content information fields) has been superseded.

Furthermore, both D1 and D2 are deficient in that verification cannot be for a predetermined period.

Conversely, the present invention, in accordance with an embodiment, creates blockchain transactions specifying a validity period.

Furthermore, both D1 and D2 are deficient in that a document cannot be revoked.

Conversely, the present invention, in accordance with an embodiment, utilises revocation-type blockchain transactions such that the revocation of the authenticity of a document may be detected by a revocation-type transaction subsequent in time to a former verification transaction.

Furthermore, D1 and D2 are deficient in that verified information cannot be displayed in association with the document for visual comparison.

Conversely, the present invention, in accordance with an embodiment, stores the meta data, such as in the computer readable data (i.e. 2D barcode) within the document itself or within the blockchain such that the information may subsequently be extracted and displayed to the user.

It is to be understood that, if any prior art information is referred to herein, such reference does not constitute an admission that the information forms part of the common general knowledge in the art, in Australia or any other country.

As such, with the foregoing in mind, in accordance with one embodiment, there is provided a method for document information authenticity verification, the method comprising: a verification record creation stage comprising: receiving document content metadata from a document; generating a metadata hash using the document content metadata; creating a blockchain transaction comprising the metadata hash; and generating computer readable data encoding the metadata hash; updating the document with the computer readable data; a document verification stage comprising: receiving the document; extracting the metadata hash from the computer readable data; and identifying the metadata hash within blockchain transactions of the blockchain to verify the authenticity of the document metadata.

As can be appreciated, D1 or D2 do not disclose the creation of a metadata hash for document information of a document, the creation of an associated blockchain transaction and the updating of the document with computer readable data (i.e. 2D barcode) with the meta will data hash.

The computer readable data may be a barcode.

The barcode may be a two dimensional barcode.

The verification record stage further may comprise signing the document with a private key associated with a document verification server.

The method may further comprise storing the document content metadata such that wherein the document verification stage further may comprise retrieving the document content metadata and displaying the document content metadata.

Storing the document content metadata may comprise encoding the metadata within the computer readable data.

Storing the document content metadata may comprise encoding the metadata within the blockchain transaction.

The verification record creation stage further may comprise identification of the document content metadata from the document.

The identification of the document content metadata may comprise optical character recognition.

The identification of the document content metadata may comprise performing search string queries against text extracted using the optical character recognition.

The identification of the document content metadata may comprise isolating text within at least one user defined region of the document.

The method may further comprise a document content updating stage comprising: receiving updated document content metadata for the document; generating a new metadata hash using the updated document metadata; creating a further blockchain transaction comprising the new metadata hash.

The document verification stage may comprise: identifying two or more blockchain transaction associated with the document.

The document verification stage further may comprise identifying that the document content metadata may be superseded by the updated document content metadata.

The method may further comprise identifying which of the document may be superseded.

The method may further comprise a document verification revocation stage comprising: creating a revocation blockchain transaction such that, during the document verification stage, the method further may comprise: identifying the revocation blockchain transaction subsequent in time to the blockchain transaction to fail the verification of the authenticity of the document information.

The blockchain transaction further specifies a validity period, such that, during the document verification stage, the method further may comprise failing the verification of the document if the validity period has expired.

The method may further comprise creating a validity period renewal blockchain transaction comprising a further validity period such that, during the document verification stage, the further validity period may be used when determining the validity of the document.

According to another aspect, there may be provided a system for document information authenticity verification, the system comprising: a document information verification server, the document information verification server comprising: a database comprising: a hash blockchain; and a document metadata table stored in relation to the one-way hash blockchain; software modules comprising: a document creation module; and a document information verification module; a client terminal in operable communication with the document information verification server, the client terminal comprising: a computer readable data reader; a software application in operable communication with the computer readable data reader, the software application comprising: a document information verification module; wherein, in use, the system may be configured for a verification record creation stage comprising: the document creation module of the document information verification server: receiving document metadata in relation to a document; receiving or generating a one-way hash from the document metadata using a hashing algorithm; creating an entry in the one-way hash blockchain for the one-way hash; generating computer readable data comprising at least one of the document metadata and the one-way hash; and sending the computer readable data to the document creation module; and a document information verification stage comprising: the document information verification module of the client terminal receiving the computer readable data from a document; at least one of the client terminal and the document information verification server identifying at least one of the document metadata and the one-way hash from the computer readable data wherein, if receiving only the document metadata, generating the one-way hash using the one-way hashing algorithm; and the document information verification module of the document information verification server verifying the document by comparing the one-way hash with the entry in the hash blockchain for the one-way hash.

The system further may comprise a document issuer server in operable communication with the document information verification server.

The document information verification server may be configured for receiving the document metadata from the document issuer server.

The document information verification stage further may comprise at least one of the client terminal and document information verification server sending at least one of the one-way hash and the document metadata to the document issuer server for further verification of the document.

The document issuer server may comprise a database comprising at least one of hash and metadata data and wherein the further verification may comprise cross-referencing at least one of hash and metadata data within the document issuer server database.

The document information verification module of the document information verification server may be further configured for sending a verification result to the client terminal.

The client terminal software application may be further configured for generating graphical user interface and wherein the graphical user interface may be configured for displaying the verification result.

The graphical user interface may be further configured for displaying at least a subset of the document metadata.

The system may comprise a plurality of document information verification servers and wherein the blockchain may be a distributed blockchain distributed across the plurality of document information verification servers.

Creating the computer readable data may comprise creating an optical computer readable data.

The computer readable data may be a 2-D barcode.

The system may further comprise inserting the computer readable data into the document.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
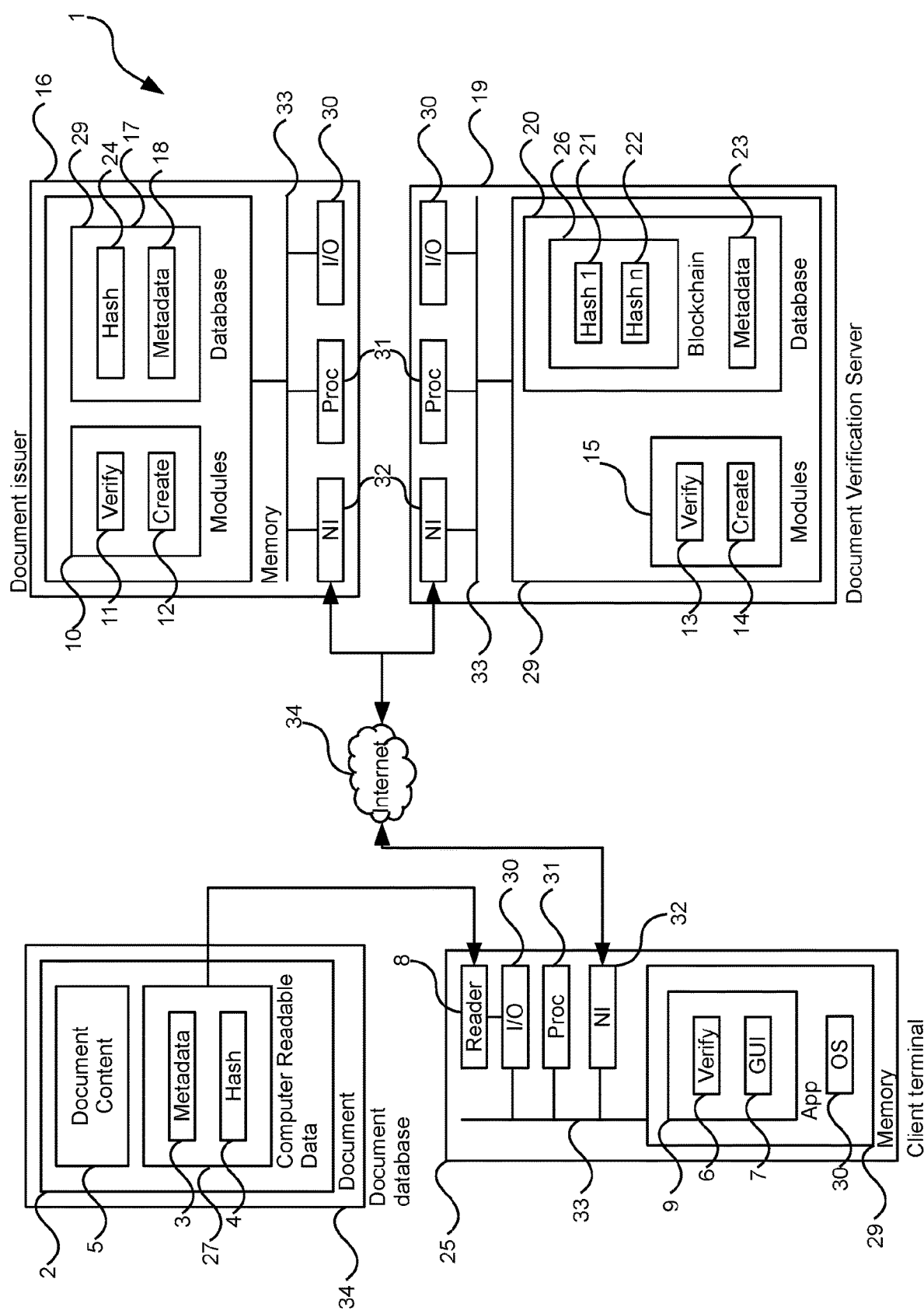
FIG. 1 shows a system for document information authenticity verification in accordance with an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

Before the structures, systems and associated methods relating to the system for document information authenticity verification are disclosed and described, it is to be understood that this disclosure is not limited to the particular configurations, process steps, and materials disclosed herein as such may vary somewhat. It is also to be understood that the terminology employed herein is used for the purpose of describing particular embodiments only and is not intended to be limiting since the scope of the disclosure will be limited only by the claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterised by," and grammatical equivalents thereof are inclusive or open-ended terms that do not exclude additional, unrecited elements or method steps.

It should be noted in the following description that like or the same reference numerals in different embodiments denote the same or similar features.

System Architecture for Document Information Authenticity Verification

Turning now to FIG. 1, there is shown a system 1 for document information authenticity verification.

As will become apparent from the ensuing description, the system 1 is configured for verifying the authenticity of documents, such as paper-based and electronic documents, especially the information presented by such documents for reducing or eliminating document forgery, falsification of qualifications and the like.

In the exemplary architecture provided, the system 1 comprises a document verification server 19. As will be described in further detail below, the document verification server 19 is configured with various software modules for performing the various computational processing tasks described herein.

In embodiments, the document verification server 19 may take the form of a physical (such as rack mounted) computer server but, in alternative embodiments, the server in relating may take the form of a virtualised server instance, such as that which may be implemented by Amazon Web Services (AWS).

As will be described in further detail below, in embodiments, the document verification server 19 maintains copy of a blockchain ledger and therefore the processes described herein of the document verification server 19 may be shared between a plurality of servers 19.

Further specifically, the document verification server 19 comprises a processor 31 for processing digital data. In operable communication with the processor 31 across a system bus 33 is a memory device 29.

The memory device 29 is configured for storing digital data including computer program code. In this manner, during operation, the processor 31 may fetch and execute instructions stored within the memory device 29 and store the data results of such execution on the memory device in 29.

The memory 29 may take the form of a combination of volatile (RAM) and nonvolatile (HDD) storage.

For illustrative convenience, the memory 29 is shown in FIG. 1 as being configured with a plurality of software modules 15 and associated data within database neural 20.

As can be seen, the software modules 15 may comprise a creation module 14 for creating document verification records which may be subsequently verified by verification module 13 in the manner described in further detail below.

Furthermore, the data shown within the database has been shown for illustrative convenience as comprising document metadata 23 and, in embodiments where a blockchain is utilised, the blockchain data 26 comprising a plurality of document hashes 21, 22 representative of document metadata 23 of various verified documents.

The document verification server 19 further comprises an I/O interface 30 for communicating with various computer peripherals including user interface peripherals and the like.

The I/O interface 30 may further interface with data storage peripherals such as USB memory storage devices. In this manner, the computer program code modules 15 may be stored on a computer readable medium which may be uploaded to the verification server 19 via the I/O interface 30 (or network interface 32) so as to configure the document verification server 19 to perform the specific computational processing tasks described herein.

The document verification server 19 further comprises a network interface 32 for sending and receiving data across a computer network illustrated as being the Internet 34 in the system 1 shown. In this manner, the document verification server 19 may be in operable communication with the other computing actors shown in FIG. 1.

In this regard, the system 1, in embodiments, may further comprise a document issuer server 16. In general terms, the document issuer server 16 is utilised by the person, entity, organisation, authority or the like issuing sensitive documents requiring authenticity verification in the manner described herein.

In this regard, the document issuer may utilise the document issuer server 16 for the purposes of storing document metadata 16, compiling and generating documents, storing and forwarding the documents across the Internet 34 and the like.

In this regard, the document issuer server 16 may similarly comprise software modules 10 having verification 11 and creation modules 12. Furthermore, the document issuer server 16 may further store document metadata 18 and associated hashes 24.

As such, the document issuer server 16 can perform, in embodiments, all of the document authenticity verification tasks and data such as where, for example, an organisation utilises the document issuer server 16 for performing the document verification in an isolated manner.

In alternative embodiments, the document issuer 16 may utilise the document verification server 19 (such as on a subscription API basis) for performing all of or at least some of the document verification tasks.

System 1 further comprises a client terminal 25 in operable communication with at least one of the document issuer server 16 and document verification server 19 across the Internet 34.

In general terms, the client terminal 25 may be utilised for displaying information indicative of the authenticity of a document.

In one embodiment, the client terminal 25 may take the form of a personal computer device such as a notebook, mobile communication device (such as a smart phone device such as an Apple iPhone or the like) which may be utilised by a user to verify the authenticity of a document.

As can be seen, the client terminal 25 may further comprise a network interface 32 for communicating across the Internet 34.

In the embodiment wherein the client terminal 25 takes the form of a mobile communication device 25, the network interface 32 may send and receive data across the cellular network such as a 3-5G cellular data network.

The client terminal 25 similarly comprises a processor 31 for processing digital data and a memory device 29 in operable communication with the processor 31 across a system bus 33.

The client terminal 25 memory 29 may further comprise an operating system 30 such as the Apple OS or Android operating systems.

Furthermore, the client terminal 25 may further comprise an I/O interface 30 which, in the embodiments shown, may interface with a computer readable data reader 8. In this regard, and as will be described in further detail below, the reader 8 may read computer readable data 27 from a document 2 for verification so as to verify the authenticity of the document.

In the embodiment wherein the client terminal 25 takes the form of a mobile communication device, the reader 8 may take the form of the image capture/camera device of the client terminal 25 and the computer readable data 27 may take the form of a two dimensional (2D) (such as a Quick Response (QR)) barcode. As such, in order to verify the document 2, the user would capture an image of the 2D barcode borne by the document 2 so as to allow the client terminal 25 to verify the authenticity thereof.

In embodiments, the client terminal 25 (taking the form of a mobile communication device) be configured utilising a downloaded software application "app" 9 which may be downloaded for installation and execution by the client terminal 25 such as from a software application store, such as the Apple App Store or the like.

In this regard, the software application 9 may comprise various sub modules/software modules including a verification module 6 and a graphical user interface module 7.

FIG. 1 further shows the system 1 comprising a document 2 which is verified by the system 1. As alluded to above, the document 2 may take the form of hard copy and soft copy documents. For the latter, the soft copy (electronic, such as in PDF format) documents may be stored within a document database 34. In this regard, particular documents may be retrieved utilising a URL and document ID or other unique identifier, such as a document hash.

As is shown, the document 2 may comprise document content 5. Furthermore, the document 2 may comprise computer readable data 27 which, as alluded to above, may take the form of a 2D barcode included or printed on the document 2. As such, the computer readable data 27 may be read by the client terminal 25 (or other computing actor across the Internet 34) so as to verify the authenticity thereof.

In embodiments, the computer readable data 27 may comprise a document ID, a document metadata hash 4 or document metadata 3 or a combination thereof depending on the particular application.

It should be noted that the computer architecture provided in FIG. 1 is exemplary primarily for illustrative purposes.

Specifically, the particular architecture provided in FIG. 1 is for the application wherein a document verification server 19 is deployed for utilisation on a subscription basis such that various document issuers, users and the like may selectively access the web functions exposed by the document verification server 19 for verifying documents.

However, it should be specifically noted that the particular architecture may be modified whilst yet performing the same document authenticity verification tasks and functionality within the purposive scope of the embodiments described herein.

Exemplary Method 35 for Document Authenticity Record Creation

Figure 3:
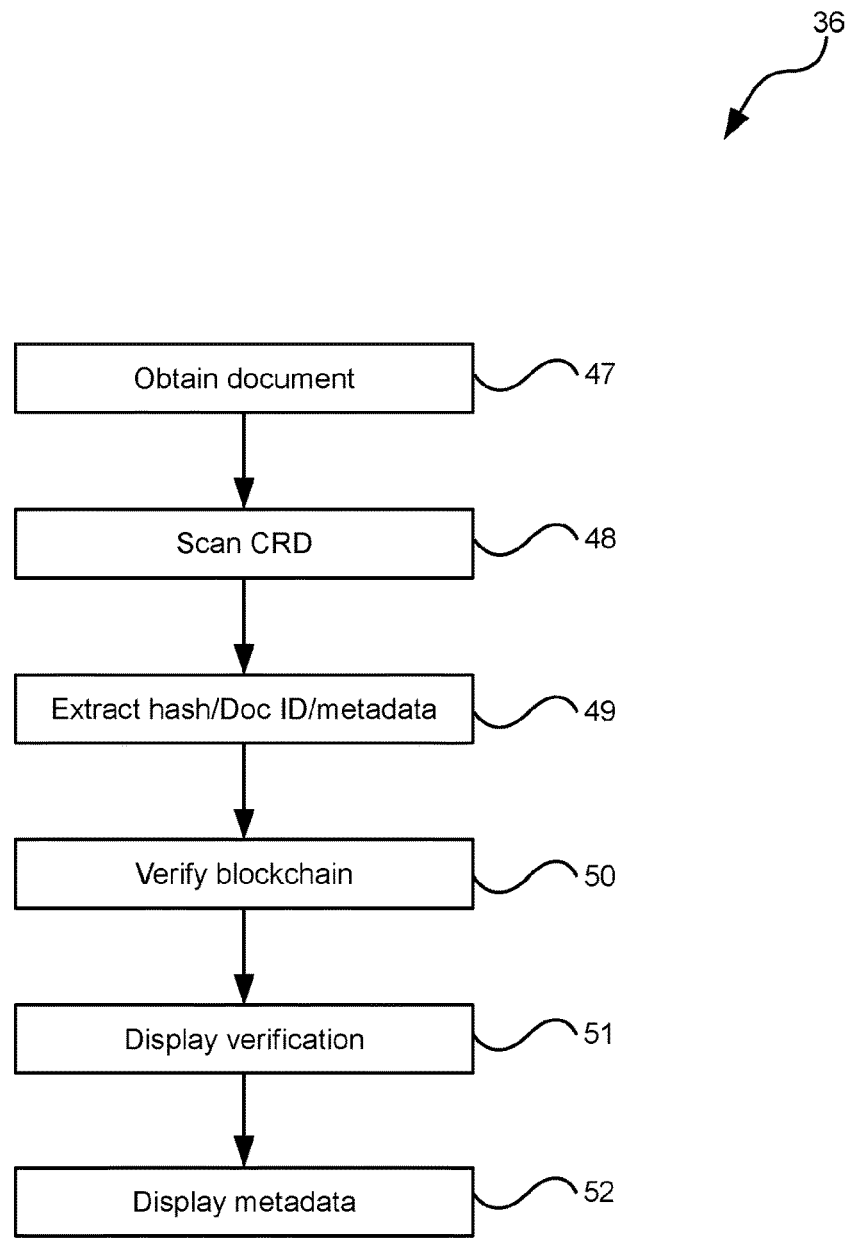
FIG. 3 shows an exemplary method for verifying the authenticity of a document using the formally created document authenticity verification records in accordance with an embodiment.

Having generally described the above computational architecture, there will now be provided various exemplary methods for utilisation of the system 1 for document authenticity verification including method 35 shown in FIG. 3 for document authenticity record creation.

The method 35 is utilised for creating document authenticity records which may be subsequently utilised and subsequent verification steps.

It should be noted that the method 35 is exemplary only and that no technical limitations should necessarily be imputed to all embodiments accordingly.

At step 39 of method 35, document content is obtained.

Where the document 2 is a physical document, the document may be scanned utilising a scanner and the document content obtained utilising optical character recognition (OCR).

Alternatively, where the document 2 is a soft copy document, the document content may be read from the electronic file system document itself (such as by reading various document metadata or document content, including wherein the document content may also be recognise using OCR) or alternatively retrieved from an appropriate database, such as the database 17 of the document issuer server 16.

Generally, the document content is the important document content (referred to herein as metadata, which is hashed into a metadata hash such as the MD5, SHA256 hash or other suitable one-way hash) for which subsequent alterations or modifications to this important document content may be detected by the system 1. In other embodiments the entire document may be hashed into a document hash so that any alterations to the document may be detected.

Also, as will be described in further detail below, the system 1 may comprise functionality for the updating of the document content/metadata, or for the revoking of the authenticity accreditation.

At step 40, various metadata may be identified. As alluded to above, the metadata represents important information contained within the document.

For example, for a statement of attainment document, the metadata may represent the name of the issue organisation, the name of the attainer and the name of the qualification. For further example, for a boarding pass, the metadata may represent the name of the passenger, the flight number, the boarding gate, the passport number the destination and the like.

In embodiments, the system 1 is configured for creating a metadata hash 4 of the metadata such that tampering of the important metadata may be detected by the system 1. Furthermore, the metadata may be kept in non-hashed format (either in plan text or encrypted) so as to allow for the subsequent display by the client terminal 25 during verification.

The use of metadata at step 40 (representing certain important document information) may be useful for hard copy documents such that the important information presented thereon is isolated for verification. In this way, the document may be modified in other manners, such as including photocopying and scanning aberrations, printing on differing letterheads or the like without affecting the ability to verify the authenticity thereof.

However, as alluded to above, it should be noted that in embodiments, especially for electronic documents, metadata need not necessarily be isolated from the document in lieu of the entire contents of the electronic data file being hashed. Specifically, in this embodiment, as opposed to hashing metadata, the electronic document file may be hash, such as the MD5, SHA256 hash or the like. In embodiments, a separate meta data hash and document hash may be utilised so that modification of the document or the sensitive meta data therein may be detected independently.

In embodiments, the metadata used may be user-specified. For example, certain metadata is used from the document issuer database 29 is user-specified.

In alternative embodiments, where the metadata is extracted from the document itself, search string filters may be specified so as to allow the system 1 to extract (including using OCR) the appropriate metadata.

For example, for the statement of attainment documentation, only the name of the organisation, attainer and qualification may be specified to be kept as the metadata for verification purposes such that the other document content may be modified without affecting the ability to verify the authenticity of the metadata of the document.

As such, various search strings may be utilised so as to allow the system 1 to extract these metadata fields.

In yet further embodiments, document regions/rectangles may be specified (representing the location of the document metadata within the document) so as to allow the system to extract text only from the specified regions.

At step 41, a document ID may be obtained or generated. In a preferred embodiment, the document ID is globally unique (GUID) so as to prevent or substantially eliminate document ID collisions.

The document ID may be utilised for uniquely identifying documents for verification. For example, the document ID may be utilised for retrieving documents from the document database 34 utilising a URL comprising the document ID. Furthermore, the document ID may be utilised for updating documents for revoking documents.

In embodiments, the document ID may be generated by the system 1. However, in alternative embodiments, the document ID 1 may be provided by the document issuer such as wherein, for example, a registered training organisation issues statement of attainment documents in numerical sequential order.

In embodiments, the document ID may also be hashed as part of the meta data hash or document hash so as to prevent tampering of the document ID.

It should be noted however, that in certain embodiments, a document ID need not necessarily be required. For example, a hard copy document may comprise a 2D barcode thereon representing a hash of the metadata, the metadata representing the information displayed by the document. As such, the 2D barcode may be scanned for verifying the document content without necessarily having to use a document ID.

In further embodiments, the hash generated from the document file or metadata may serve as the unique document ID.

At step 42, a hash 4 is created. Preferably, the hash is a one-way hash such as MD5, SHA256 or the like. The hash provides the ability to reduce potentially a large amount of information into a small size but, importantly, wherein tampering even with a single letter of the content drastically affects the hash.

In a preferred embodiment, the hash 4 is a meta data hash such that the meta data (important document information) is hashed so as to be able to detect subsequent altering of this important document information. However, as also alluded to above, in other embodiment, the hash 4 may be a document hash of the electronic document file.

Other information may also be hashed within the hash 4, including the document ID.

In embodiment, a combination of the above information may be hashed to form the hash 4.

In a preferred embodiment, the system 1 utilises a blockchain for the purposes of storing the hashes 4 so as to be able to provide an unalterable distributed and trusted ledger of verifying documents.

Specifically, as is shown in FIG. 1, the document verification server 19 may store a copy of a blockchain ledger 26 within the database 20 which may be synchronised with other documentation verification server 19.

As such, at step 43, the hash is added to a blockchain transaction which is then subsequently mined and added to a block in the blockchain. There are differing manners in which the hash may be added to a blockchain, including, wherein the bitcoin blockchain is utilised, within the bitcoin scripting opcode. In alternative embodiments, a customised blockchain may be utilised comprising appropriate data fields.

As such, when verifying a document, the blockchain may be inspected to ascertain whether the hash 4 (which may be scanned from the 2D barcode 27 or alternatively calculated on the fly) resides within the blockchain.

In embodiments, the entire blockchain may be searched for a hash but, in a preferred embodiment, a separate hash index may be used for speeding the hash finding process.

It should be noted that not all embodiments necessarily utilise a blockchain. For example, the document issuer server 16 may maintain the database of document metadata 18 (or document content) and associated document hashes 24 or document IDs for the purposes of allowing for the verification of documents in isolation without the utilisation of a shared ledger. It is way, the system 1 yet maintains a copy of the meta data 18 (so as to, for example, allow for the display of the meta data during the verification process for visual comparison by the user) and associated hashes so as to be able to detect tampering of the meta data (albeit without security against the database 17 tampering which may be avoided utilising the blockchain).

At step 44, computer readable data may be generated which may then be utilised in conjunction with the document for verification.

At step 46, the computer readable data is inserted into the document, either visibly or invisibly.

In one embodiment alluded to above, the computer readable data 27 may take the form of a 2D barcode comprising one or more of the document hash, document ID and document metadata.

In a preferred embodiment, the computer readable data 27 is visible so as to allow for printing, scanning and photocopying of the document.

For example, the document may be modified to visibly display the computer readable data 27 such as wherein, for example, a PDF document is modified to include an image of the 2D barcode at the bottom right-hand side of the document. In this way, when subsequently verifying the electronic document, or a printout thereof, the user may utilise the camera device of the smart phone 25 to capture an image of the 2D barcode to verify the contents or the metadata of the document.

In alternative embodiments, for electronic documents existing solely in electronic form the computer readable data 27 need not necessarily be human visible and may be incorporated within, for example, the metadata of the document. In this way, when displaying the document the document display software may, in the background, inspect the associated metadata and displaying and indication as to whether the document is verified or not.

For example, a PDF document may be updated such that the PDF document metadata comprises the computer readable data 27 (which, as alluded to above, may include one or more of the document metadata, document ID and a document hash). As such, when being displayed within the PDF application, such as Adobe Acrobat reader, the PDF software may automatically inspect the computer readable data 27 and display an indication as to whether the document is verified or not.

In alternative embodiments, such as when utilised for travel documentation and the like, RFID tags may be used.

At step 46, where the document takes the form of an electronic document, the document may also be digitally signed so as to prevent tampering or modification of the computer readable data included or inserted thereon.

In one embodiment, the document verification server 19 may sign the document using a private key such that others may subsequently verify that the document verification server 19 had indeed signed the document utilising the associated public key.

Exemplary Method 36 for Document Authenticity Verification

Figure 2:
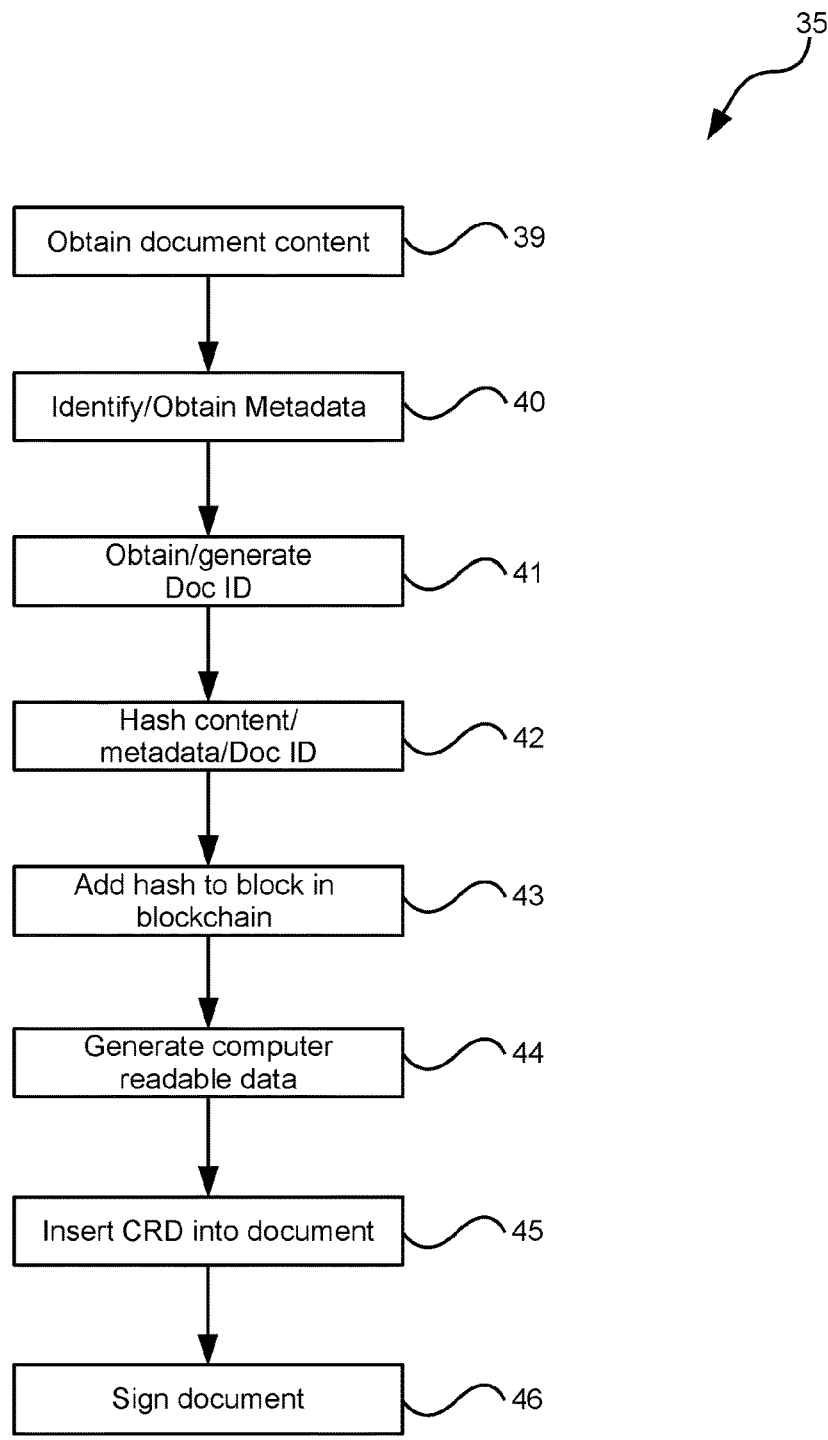
FIG. 2 shows an exemplary method for the creation of document information authenticity verification records in accordance with an embodiment.

Turning now to FIG. 2, there is shown an exemplary method 36 for document authenticity verification. As will become apparent from the ensuing description, the method 36 is utilised for the purposes of verifying the authenticity of a document utilising the computer readable data 27 associated therewith.

The method 36 starts at step 47 wherein the document is obtained. For example, a physical document may be obtained in hand or alternatively, an electronic document may be retrieved from a file system, downloaded from a URL or the like.

At step 48 the computer readable data associated with the document is scanned or read.

For a physical document comprising the computer readable data 27 in the form of a 2D barcode, the barcode may be read utilising the reader 8 of the client terminal 25.

For electronic document, the computer readable data 27 may be retrieved by the document display software (such as Adobe Acrobat).

At step 49, the hash may be extracted from the computer readable data 27.

Where the computer readable data comprises the document ID, the document ID may also be retrieved from the computer readable data so as to be able to compare against the document ID used to retrieve the document or associated with the document.

At step 50, where the system 1 utilises a blockchain, the blockchain may be inspected for blocks containing transactions containing the hash and, in embodiments, the associated document ID.

Should a matching transaction be found within the blockchain, at step 51, a verification may be displayed to the user indicating that the document is authentic.

Additionally, at step 52 metadata may be extracted from the computer readable data which may then be displayed by the client terminal 25 so as to allow the user to compare the metadata extracted from the computer readable data to that which is displayed on the document.

In certain other embodiments, the meta data 23 may be stored within the blockchain 26 itself such that the metadata 23 may be retrieved from the blockchain 26 during verification so as to negate the need to store the metadata 23 within the 2D barcode 27 itself.

Exemplary Method 37 for Updating Document Metadata

Figure 4:
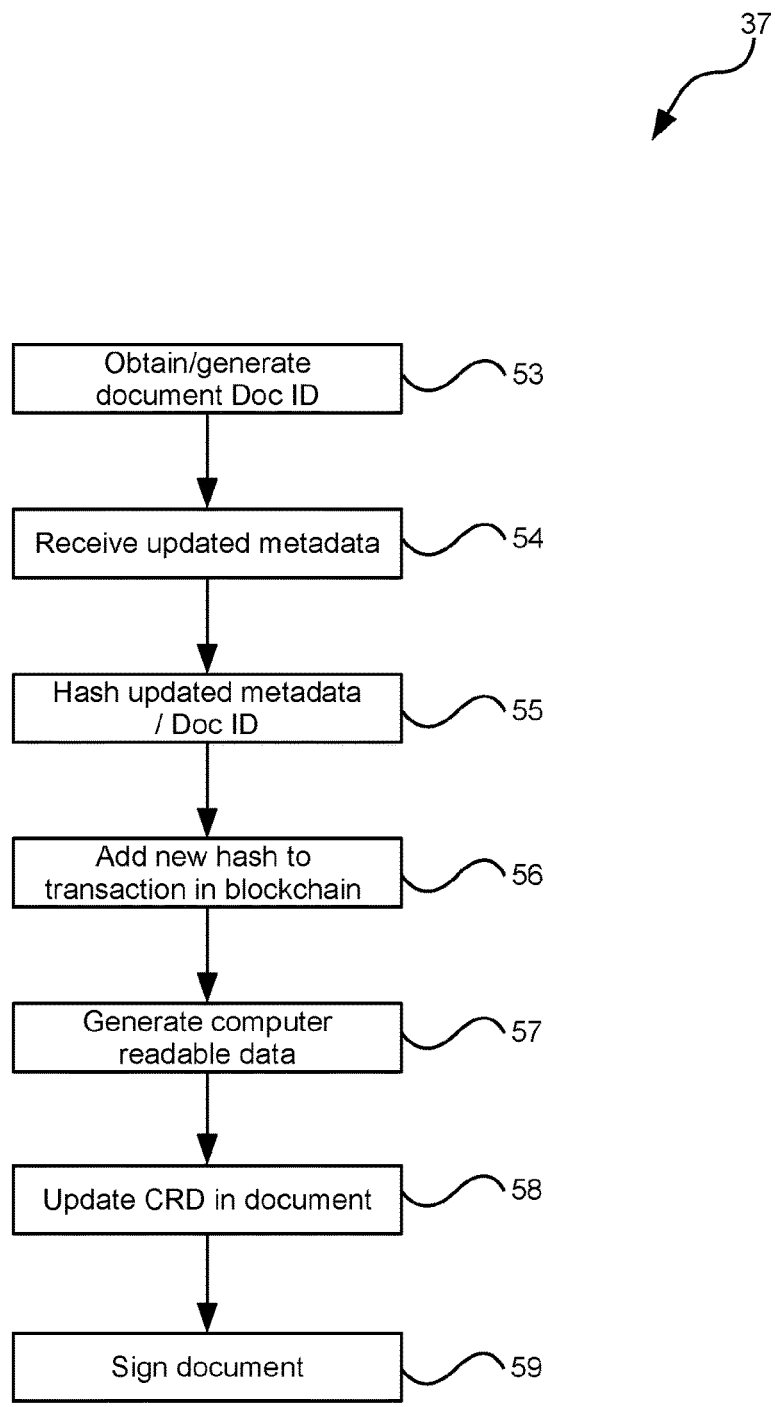
FIG. 4 shows an exemplary method for updating document information while yet being able to verify the authenticity of the updated document in accordance with an embodiment.

Turning to FIG. 4, there is shown an exemplary method 37 for updating document metadata.

Specifically, in embodiments, a need may arise to update document metadata.

For example, for boarding passes, a gate change may occur. A further example, for a statement of attainment, the name of the attainer may be changed from a maiden name.

As such, method 37 may be utilised for allowing updating of certain document fields while yet being able to maintain the ability to verify the authenticity of a document.

As such, at step 52, the document ID for the document to be updated may be generated or obtained (or other unique identifier such as the document or metadata hash).

At step 54, the updated metadata (or document content) is received. For example, the updated metadata may comprise a new surname.

The updated metadata (or updated document content) is hashed at step 55.

Now, at step 56, the new hash is added by way of a further transaction to the blockchain.

At step 57-59, the document may be modified to incorporate the new computer readable data 27. However, the updating of the 2D barcode 27 need not necessarily take place, especially for documents which have already been disseminated.

As such, when subsequently verifying the document, the blockchain transactions may be inspected in reverse chronological order wherein the most recent in time verification transaction is utilised as the current verification transaction.

Alternatively, should a hash be extracted from a document associated with a blockchain transaction for which a more recent blockchain transaction exists, the client terminal 25 may inform the user that the document metadata/content is out of date and that the document has been superseded.

In embodiments, the verification result may indicate that the document has been superseded. However, in other embodiments the verification result may indicate which document content metadata has been superseded.

For example, when creating a first blockchain verification transaction, the document ID and the original metadata hash may be stored within the blockchain.

Then, when receiving an update to the document metadata, and new blockchain transaction may be created within the blockchain comprising the document ID and the new metadata hash (representing the updated metadata).

As such, during subsequent verification of the document, the computer readable data 27 may be read by the client terminal 25 to extract the document ID and the metadata hash.

Then, the blockchain may be searched for blockchain transactions associated with the document ID.

However, should the system 1 identify two or more transactions, the system 1 is able to compare the retrieved hash against the two or more transactions to identify whether the particular transaction is current or has been superseded.

Exemplary Method 38 for Document Authenticity Revocation

Figure 5:
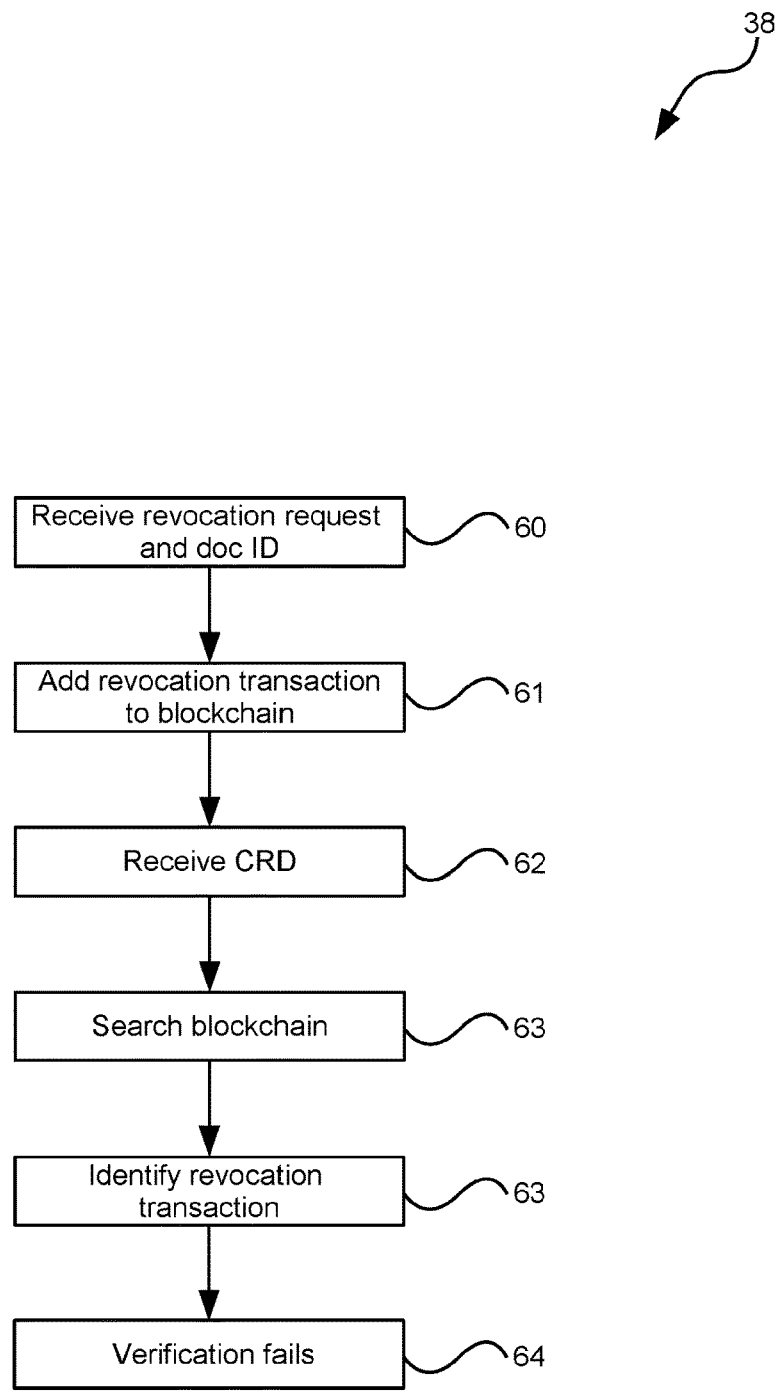
FIG. 5 shows an exemplary method for revoking the authenticity records of a particular document in accordance with an embodiment.

Turning now to FIG. 5, there is shown an exemplary method 38 for document authenticity revocation.

Specifically, a need may arise to revoke a document. For example, a person having received a statement of attainment may have subsequently have been found out to having fraudulently obtained the qualification and therefore the statement of attainment requires revocation.

Where blockchain technology is utilised, it is not possible to delete a transaction from the blockchain.

As such, the method 38 utilises a revocation transaction which is added to the blockchain to revoke a document.

Specifically, the method 38 starts at step 60 wherein a revocation request is received for a particular document as is identified by a document ID (or other unique identifier such as the document or metadata hash).

At step 61, a revocation transaction is added to the blockchain. The revocation transaction is identified by transaction type (the revocation transaction type, which may again be stored in the bitcoin scripting opcode) and the document ID.

As such, during subsequent verification, at step 62 the computer readable data is received for the document and the document ID and or document hash is extracted therefrom.

At step 63, the blockchain is searched for matching document IDs or hashes.

However, for any verification transactions identified within the blockchain, at step 63, the system 1 identifies a subsequent revocation transaction within the blockchain associated with the document ID or hash and therefore, at step 64, the verification fails.

Finite Authenticity Verification Periods

In embodiments, documents may have a finite authenticity. Wherein, for example, documents are valid for 12 months only such as the case may be for driver licenses.

As such, verification transaction stored within the blockchain may specify a validity period (which may again be stored in the bitcoin scripting opcode). As such, during verification, the system 1 may inspect the entry dates of the verification transactions and should the current date exceed the validity period, the verification fails.

For example, should the system 1 identify a verification transaction within the blockchain from more than 12 months ago but whereas the verification transaction specifies that the verification is valid for a period of 12 months, and the system 1 is unable to identify any further subsequent in time verification transactions associated with the document, then the verification fails.

In this regard, validity period may be renewed through the addition of subsequent in time blockchain verification transactions.

Exemplary Use of the System 1 Architecture for Verification of Statement of Attainment Documents Issued by Registered Training Organisations (RTO)

Having described the above system 1 architecture and associated methodologies, there will now be described an exemplary use of the system 1 for utilisation for application for the verification of statement of attainment documents issued by registered training organisations (RTO).

As can be seen, the document issuer (RTO) server 16 comprises a plurality of software modules 10.

In the embodiments described herein, the software modules 10 may comprise a verification record creation module 12 for the purposes of creating a document record for subsequent verification.

As can be also seen, the document information verification server 19 may itself comprise a plurality of software modules 15 itself comprising a verification record creation module 14.

Furthermore, the software modules 10 of the document issuer (RTO) server 16 may further comprise a verification module 11 for the subsequent verification of documents.

Similarly, the software modules 15 of the document information verification server 19 similarly comprise a verification module 13 the purposes of verifying documents as will be described in further detail below.

As alluded to above, such verification and creation functionality may be implemented by the same modules if the functionality of the document issuer (RTO) server 16 and the document information verification server 19 is implemented by a single server.

In this exemplary embodiment, a person by the name of James Smith successfully completes a course at a particular RTO.

Having completed the course, the particulars of the statement of attainment or course are recorded by the RTO.

Specifically, as can be seen, the document issuer (RTO) server 16 comprises a database 17.

Furthermore, the database 17 may comprise metadata 18, or other type of structured data, configured for storing various information fields in relation to the course completed by James Smith.

As such, the following information may be recorded in the database 17:
 a. Name: James Smith
 b. Issued Date: 7 Jul. 2007
 c. Document Number: 0007/07/2007
 d. Issuing RTO: Allwest Training service
 e. National Provider Code No: 51925
 f. Type of Certification: Statement of Attainment/Course
 g. Signing officer: Bob Cooper
 h. Signing officer position: Chief Executive Officer Now, during the verification record creation stage, a hash is created of the above metadata. In one embodiment, the metadata is concatenated such as into a string comprising:
 a. James Smith|19051983|M|007 007 007|0007/07/2007|Allwest Training service|51925|07072007|Statement of Attainment|Conduct haul truck operations|Bob Cooper|Chief Executive Officer Next, the concatenated string is hashed using a one-way hash algorithm, such as an MD5, SHA256 or other hash algorithm. For example, such a hash may generate the following hash:
 a. 25908e49524e4828190dae3d796894eec7ec3e4843c8bca6ef9f384c679167bc Next, the metadata hash is stored so as to be usable for subsequent document information verification.

Specifically, as can be seen, the document information verification server 19 comprises a database 20 for storing various information including hash data.

As such, the above metadata hash is inserted into the database 20. Such insertion may comprise the document information verification server 19 receiving the metadata (or the metadata hash) from the database 17 of the document issuer (RTO) server 16, such as at periodic intervals, upon request and the like.

It should be noted that the hashing algorithm described herein may be performed by any of the computing actors within the purposive scope of the embodiments described herein. In other words, for example, the document issuer (RTO) server 16 or the document information verification server 19 may perform the hashing.

In a preferred embodiment, so as to prevent fraud arising from the insertion of fraudulent hashing entries into the database 20, the system 1 may implement a distributed public ledger blockchain 26 such that each hash entry is verifiable in accordance with the other hash entries within the database 20.

In the embodiments described herein, the verification is performed by a single document information verification server 19. However, it should be appreciated that the blockchain 26 may be a distributed blockchain distributed across a number of servers 19.

It should be noted that any distributed cryptography based blockchains may be utilised within the purposive scope of the embodiments described here and including those being used in, or being similar to Bitcoin, ehterum, litecoin blockchains and the like.

In these embodiments, each RTO 16 ("document information issuer") and document verification server 19 may be assigned an "issuer address", which may be a Bitcoin wallet address. Capacitor, transactions within the Bitcoin blockchain may be uniquely associated with the respective document issuer server 16 or document verification server 19.

In embodiments, the metadata may also be stored within the database 20 of the document information verification server 19. In this manner, having the hash (or document ID), the metadata may be looked up.

In this embodiment, the hash may serve as a primary key. However, it should be appreciated that the database 20 need not necessarily comprise the metadata 23 so as to comprise the hash only for the purposes of document information verification.

Now, computer readable data is generated comprising at least one of the hash and the metadata. The creation of the computer readable data will allow the insertion of the computer readable data onto a document, such as a certificate of attainment, being a paper-based or electronic (i.e. PDF) document which may be subsequently read using the client terminal 25 for the purposes of verifying the authenticity of the document and the document metadata stored therein.

In a preferred embodiment, the computer readable data is embodied in a 2D barcode. For example, when generating the 2-D barcode computer readable data, the following formats may be utilised for data encoding:
 a. [Key_hash]|||[Name]|||[BirthDate In DD/MM/YYYY]|||[Gender]|||[DL Number]|||[Document Number]|||[Issuing RTO]|||[National Provider Code No]|||[Issued Date In DD/MM/YYYY]|||[Type of Certification]|||[Type Of License]|||[Signing officer]|||[Signing officer position]

Figure 7:
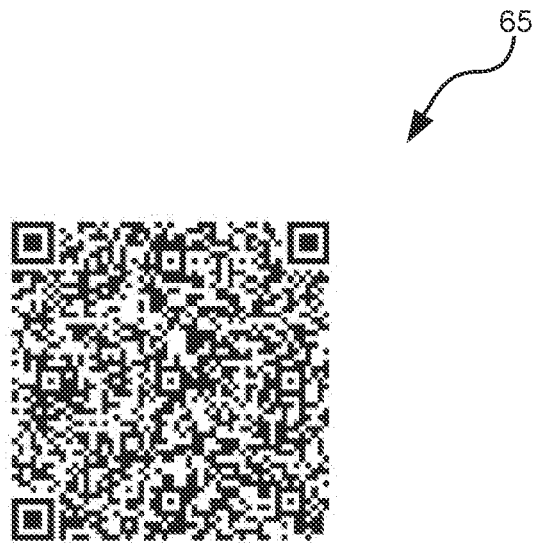
FIG. 7 shows computer readable data embodied in a 2D barcode.

Such may be generated using an appropriate algorithm into the 2-D barcode 65 shown in FIG. 7. Having created the computer readable data, the computer readable data is then inserted into or printed onto a document.

As can be seen from FIG. 1, there is shown a document 2 being a certificate of attainment for the course completed by James Smith. In this particular embodiment, the document 2 is issued as a PDF document by the document issuer (RTO) server 16. As such, James Smith may utilise the electronic PDF document 2 as evidence of his qualification for various employment purposes.

As can be seen, the document may comprise document content 5 which may comprise the usual human readable information including at least a subset of the above described metadata. However, as alluded to above, in prior art arrangements document may be edited, either electronically or physically so as to represent fraudulent information.

As such, the document, by additionally comprising the computer readable data 27 may be verified using the client terminal 25. As can be seen, the computer readable data 27 borne by the document 2 may comprise at least one of the metadata 3, the metadata or document hash 4 and the document ID.

In embodiments, only the metadata 3 is be encoded within the computer readable data 27 such that the hash may be calculated from the metadata for verification. In other embodiments, only the hash 4 is encoded within the computer readable data 27 such that the metadata may be retrieved from the database 20 of the document information verification server 19 or the database 17 of the document issuer (RTO) server 16 or the blockchain.

As can be seen, the client terminal 25 comprises a software application 9 configured for implementing the features and functionality described herein. As alluded to above, in embodiment, the client terminal 25 is a mobile communication device, such as a smart phone device or the like. Herein, the client terminal 25 may comprise a reader 8, which, in embodiments may take the form of the mobile phone camera.

In use, the operation of the client terminal 25 may download the software application 9 for execution by the client terminal 25, such as from a software application store, such as the Apple iTunes store or the like.

As can be seen, the software application 9 may comprise a verification module 6 configured for implementing the client terminal implemented functionality for document information verification and also a graphical user interface (GUI) module presented a graphical user interface for display to the 7 for the purposes of displaying various information to the client terminal user.

As such, in order to verify the authenticity of the document, the client terminal user, using the reader 8, will scan the 2-D barcode computer readable data 27 provided on the document. Having received the computer readable data from the document 2, at least one of the client terminal 25 and the document information verification server 19 is configured for identifying at least one of the metadata 3 and the hash 4.

In a preferred embodiment, the metadata 3 is encoded within the computer readable data 27 such that the GUI 7 of the client terminal 25 may display the metadata.

In a further preferred embodiment, both the hash 4 and the metadata 3 is encoded within the computer readable data 27 such that the client terminal 25 may generate a hash using the hashing algorithm using the encoded metadata 3 so as to verify at least that the encoded hash 4 matches the metadata 3. In embodiments, a propriety hash algorithm may be utilised so as to prevent fraudsters from fraudulently generating and encoding the hash using a known hashing algorithm.

Further, the client terminal 25, by being in operable communication with the document information verification server 19 across a data network, such as the Internet, is able to send at least one of the metadata 3 and the hash 4 to the document information verification server 19 for verification.

The document information verification server 19 is configured to compare the hash received from the client terminal 25 (or calculated from the metadata 3 read by the client terminal 25) against the hash value stored within the blockchain 26.

If a match is found, the document information verification server 19 is able to send a verification result back to the client terminal 25 verifying that the document information is authentic.

Alternatively, should no match be found, the verification server 19 is configured to send and non-verification result back to the client terminal 25 indicating that the document information may be fraudulent or has been tampered with.

In either case, the GUI 7 is configured for displaying the verification results to the client terminal user. Additionally, the GUI 7 may display the associated metadata.

Figure 6:
FIG. 6 shows an exemplary graphical user interface displayed by a client terminal of the system when verifying a document of FIG. 1 in accordance with an embodiment of the present disclosure.

For example, and turning now to FIG. 6, there is shown an exemplary interface 28 displayed by the GUI 7 where the document has been verified. As can be seen, the interface 28 comprises various of the metadata and a confirmation that the document information is authentic.

In embodiments, the system 1 is configured for implementing a further verification wherein the records held within the RTO server database 17 are further cross-referenced (in case the records have been updated or revoked). Specifically, cross-referencing may be performed using at least one of the hash and the metadata. As can be seen, in embodiment, the database 17 of the document issuer (RTO) server 16 may be configured for storing the hash values 24 in relation to the metadata 19. As alluded to above, such hash values 24 may be received from the document information verification server 19 or alternatively be computed by the document issuer (RTO) server 16 itself. As also alluded to above, in embodiments, the database 17 need not necessarily comprise the hash values 24 wherein the metadata 18 is cross-referenced.

When the metadata 18 is cross-referenced, at least one of the client terminal 25 and the document information verification server 19 may send a further query to the verification module 11 of the document issuer (RTO) server 16 to verify the data stored within the database 17. For example, the client terminal 25 may send the document number to the RTO server 16 to verify that the document number is genuine. Other cross-referencing may be done within the purposive scope of the embodiments described herein.

Exemplary Use of the System 1 for Hard Copy Documentation

There will now be described an exemplary use of the system 1 for hard copy documentation.

Specifically, as alluded to above, problems of hard copy documentation may include the appearance of the documentation changing over time, such as by being caused by photocopying aberrations and the like.

As such, in this exemplary use, there will be described the system 1 yet being able to verify the hard copy document despite changes in appearance.

Specifically, in this example, the hard copy document is a contract of sale document which has been countersigned by the seller, purchaser and witness. The hard copy document further specifies the immovable property being sold, identified by lot number.

As such, for the purposes of creating the document verification records, the executed contract document may be scanned using a scanner and wherein the system 1 then performs OCR recognition of the document to identify relevant metadata from the contract of sale. In this example, the relevant metadata is the names of the seller and purchaser and lot number.

As such, the system 1 is configured to extract such metadata from the document. For example, utilising OCR, the system 1 may be configured to utilise string matching or the like to extract these fields from the data.

Alternatively, an image scan of the document may be displayed on the client terminal 25 such that the lawyer is able to demarcate the metadata to be verified, such as by dragging rectangles around the associated text using the mouse.

Additionally, a document ID may be specified by the lawyer, being a file system generated document ID.

Having obtained the relevant metadata, the system 1 hashes the metadata (and the document ID in embodiments) and creates a verification transaction within the blockchain.

Furthermore, the system 1 generates computer readable data in the form of a 2D barcode which is then printed onto the contract of sale document.

The 2D barcode comprises the metadata hash 4, the document ID and the metadata.

The contract of sale is then photocopied and a photocopy is then sent to a conveyancer.

However, slight visual aberrations occur during the photocopied process.

Nevertheless, to verify the contract of sale, the conveyancer captures an image of the document utilising the camera of the conveyancer's mobile communication device 25.

The mobile communication device 25 comprises an application 9 which identifies the 2D barcode and extracts the metadata hash, document ID and metadata from the 2D barcode.

The mobile communication device 25 then sends a verification request across the Internet 34 to the document verification server 19. The verification request comprises the hash but, in embodiments, may additionally include the document ID.

The document verification server 19 then searches through the verification transactions of the blockchain and identifies the earlier verification transaction created.

The document verification server 19 then sends a verification response to the mobile communication device 25 such that the mobile communication device 25 is able to display an indication that a verification record exists.

Now, in one embodiment, the conveyancer's mobile communication device 25 may display the metadata extracted from the 2D barcode. As such, the conveyancer may visually inspect the names of the parties and the lot number on the document as is displayed by the mobile communication device 25 so as to ensure their consistency.

It should be noted that the client terminal 25 may rehash the metadata stored within the 2D barcode so as to confirm whether the generated hash matches the hash of the 2D barcode (so as to prevent tampering of the metadata within the barcode).

Alternatively, during the initial verification transaction, the metadata may also have been stored within the blockchain such that the metadata may sent to the client terminal 25 from the document verification server 19 for display.

In alternative embodiments, as opposed to displaying the metadata fields for visual comparison by the conveyancer, the mobile communication device may perform optical character recognition so as to read the text from the document (despite the photocopying aberrations) and confirm whether the recognised text matches the metadata.

For example, for the metadata stored within the 2D barcode or the blockchain, the client terminal 25 may search the OCR text to identify such metadata. If such is not identified, such as of the scanned document does not contain the same lot number, then the verification fails.

In embodiments, the relevant metadata is demarcated within boundaries such as wherein, for example, in the embodiment described above, the lawyer draws rectangles over the metadata displayed on screen to be verified. For example, the lot number may be in the middle top centre of the page whereas the names of the parties may be at the bottom left-hand right corners of the document respectively.

As such, during the verification, the mobile communication device 25 is configured for recognising text only within the demarcated boundaries and then comparing the text extracted from these demarcated boundaries against the metadata. When utilising the camera, the mobile communication device 25 may identify the page corners for orientation so as to be able to accurately place the demarcated boundaries.

Exemplary Use of the System 1 Architecture for Verification of Boarding Passes

There will now be described the exemplary use of the system for the verification of boarding passes.

Specifically, problems exist with existing boarding pass systems in that the data printed thereon may be tampered with. Additionally, database entries may be modified to match the tampered print such that, during check-in, the boarding staff may not notice a boarding pass which has been tampered with to match a modified database entry.

As such, in this embodiment, when initially printing the boarding passes, the passenger record computing system sends relevant metadata to the document verification server 19.

In this embodiment, relevant metadata may include the boarding pass ID, name of the passenger, and the departure gate.

The document verification server 19 may hash the metadata and create an entry within the blockchain and send a 2D barcode to the passenger record computing system which is then printed onto the boarding pass.

Now, prior departure, flight rescheduling may result in an update of the gate number. As such, the passenger record computing system identifies all affected passengers and, for those affected passengers identified, sends an update notification to the document verification server 19.

For example, for each boarding pass, the passenger record computing system may send the boarding pass ID and updated gate number.

For each update, the document verification server 19 creates a new entry within the blockchain.

Now, during check-in, the 2D barcodes of the boarding passes are scanned and the boarding pass ID, and metadata (passenger name and gate number) are extracted from the barcodes. In bottoms, such information may also be retrieved via OCR from the boarding pass print.

Such extracted metadata may be then sent to the document verification server 19 for verification.

In embodiments, the boarding gate computer may maintain a copy of the blockchain so avoid time-consuming queries across the Internet to the document verification server 19.

Now, assuming that there was an attempt to substitute a passenger with another name, the boarding pass may have been tampered with to change the name printed on the boarding pass and also the associated entry within the passenger record computing system database. The metadata stored within the 2D barcode may additionally have been modified.

However, for such a name modification, the verification by the document verification server 19 would fail because the document verification server 19 would fail to match a hash of the new name against a hash stored within the blockchain.

Now, for the updated gate number, the boarding pass may still represent the old gate number.

As such, the hash encoded within the 2D barcode would be obsolete (because it still represents the old gate number).

However, at check-in, the new gate number may be sent by the passenger checking computer to the document verification server 19 wherein the document verification server 19 is able to identify a further verification transaction in relation to the boarding pass ID with the new gate number and therefore pass the verification of the boarding pass. In this regard, it should be noted that the verification would fail for any other gate number provided not matching the gate updating transaction within the blockchain.

Interpretation
Wireless:

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor:

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

Carrier Medium:

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation:

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

SCOPE OF INVENTION

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

The invention claimed is:

1. A method for document information authenticity verification, the method comprising:
 a verification record creation stage comprising:
 receiving document content metadata from a document;
 generating a metadata hash using the document content metadata;
 creating a blockchain transaction using the metadata hash;
 generating computer readable data encoding the metadata hash;

updating the document with the computer readable data; and signing the document with a private key associated with a document verification server;

a document content updating stage comprising:

receiving updated document content metadata for the document;

generating a further metadata hash using the updated document content metadata; and creating a further blockchain transaction using the further metadata hash; and a document verification stage comprising:

receiving the document;

verifying, by a client terminal, the document using a public key of the document verification server;

extracting the metadata hash from the computer readable data;

identifying the blockchain transaction of the blockchain to verify the authenticity of the document content metadata; and inspecting the blockchain in reverse chronological order to identify the further blockchain transaction to identify that the document content metadata is superseded by the updated document content metadata; and a document verification revocation stage comprising:

creating a revocation blockchain transaction; and identifying, during the document verification stage, the revocation blockchain transaction subsequent in time to the blockchain transaction to fail the verification of the authenticity of the document information.

2. The method as claimed in claim 1, wherein the computer readable data is a barcode.

3. The method as claimed in claim 2, wherein the barcode is a two dimensional barcode.

4. The method as claimed in claim 1, further comprising storing the document content metadata wherein the document verification stage further comprises retrieving the document content metadata and displaying the document content metadata.

5. The method as claimed in claim 4, wherein storing the document content metadata comprises encoding the metadata within the computer readable data.

6. The method as claimed in claim 4, wherein storing the document content metadata comprises encoding the metadata within the blockchain transaction.

7. The method as claimed in claim 1, wherein the verification record creation stage further comprises identification of the document content metadata from the document.

8. The method as claimed in claim 7, wherein the identification of the document content metadata comprises optical character recognition.

9. The method as claimed in claim 8, wherein the identification of the document content metadata comprises performing search string queries against text extracted using the optical character recognition.

10. The method as claimed in claim 8, wherein the identification of the document content metadata comprises isolating text within at least one user defined region of the document.

11. The method as claimed in claim 1, further comprising identifying which of the document content metadata is superseded.

12. The method as claimed in claim 1, wherein the blockchain transaction further specifies a validity period, wherein during the document verification stage, the method further comprises failing the verification of the document when the validity period has expired.

13. The method as claimed in claim 12, further comprising creating a validity period renewal blockchain transaction comprising a further validity period wherein during the document verification stage, the further validity period is used when determining the validity of the document.

14. The method as claimed in claim 1, wherein creating the blockchain transaction using the meta data hash comprises storing a document ID of the document and the meta data hash within the blockchain and creating the further blockchain transaction further comprises storing the document ID and the further metadata hash within the blockchain and wherein inspecting the blockchain in reverse chronological order comprises searching the blockchain using the document ID.

* * * * *